Patented Aug. 16, 1938

2,126,854

UNITED STATES PATENT OFFICE 2,126,854

PROCESS FOR PREPARING IMPROVED DERRIS AND CUBE EXTRACTS AND HYDROGENATED DERIVATIVES AND PRODUCTS PRODUCED THEREBY

Robert Wotherspoon, East Orange, N. J., assignor to Derris, Inc., New York, N. Y., a corporation of New York No Drawing. Application April 28, 1934, Serial No. 722,968

17 Claims. (Cl. 167—24)

My invention relates to the production of insecticides and insect repellent substances and refers particularly to such products producible from derris, cube root and similar sources of supply for the products mentioned.

The active principles of Derris (Deguelia) sp. (tuba root) and Lonchocarpus nicou (cube root) consist of a mixture of rotenone, deguelin, tephrosin, toxicarol and several other chemical bodies of lesser insecticidal value.

Several other plant materials such as the roots of the germs Spatholobus contain one or more of the above mentioned constituents.

These active principles are soluble in a great many organic solvents such as ethyl acetate, benzole, acetone, chloroform, ethylene dichloride, safrol, et cetera.

These solutions of active principles may be subjected to the action of hydrogen in the presence of an active catalyst, such as nickel, to form dihydro-rotenone and hydrogenated products of the other principles, which have not as yet been identified. These hydrogenated products are more stable to light and air than the original material and no doubt will be of great commercial value.

Concentrated horticultural insecticides containing the above mentioned principles are usually prepared from a concentrated organic solvent solution of derris or cube such as acetone, ethylene, dichloride, safrol, et cetera, with or without a spreading agent, and with or without other insecticidal principles such as pyrethrum, et cetera.

Other uses have been found for these insecticidal principles. They are now being used in preparation of mange remedies, insecticidal soaps, body lice preparations, et cetera.

The need for a dry product containing these principles has developed as a result of these new outlets. Heretofore the extracts of cube, derris, et cetera which was obtained by evaporating off the solvent used to extract the principles from the roots were of a viscous nature. This viscous material was difficult to handle and difficult to remove from the containers in which it was placed.

I have found that in the case of derris extract this viscous property is due to the presence of a small amount of the solvent used for extraction and also to the presence of an hitherto undiscovered constituent of derris root, i. e. essential oil of derris. This essential oil with, or without, the traces of solvent left in the extract keeps the product in a soft condition.

Proper removal of all, or part, of these materials results in a product that is readily pulverizable, thereby enhancing its commercial practicability.

There are several ways of accomplishing this, among which are the following:—

Example 1

The organic solvent solution of these insecticidal principles, hydrogenated or not, is placed in a still equipped with steam heating coils or a steam jacket. The contents are heated to the boiling point and the solvent distilled off. The traces of solvent left in the mass is removed by subjecting it to the action of steam introduced through an open steam line placed in the still or by adding water to the residue and raising it to the boiling point. The steam carries off the traces of solvent and by prolonging the operation all, or part, of the essential oil of derris is brought over in the same manner. The vapors are condensed and the essential oil is separated from the water.

The oil possesses the following characteristics:—

| | |
|---|---|
| Specific gravity @ 25° C | .998 |
| Optical rotation 100 m. m. tube | +5° |
| Saponification value | 24 |
| Saponification value after acetylization | 82.6 |
| Boiling range 760 m. m. | 210–250° C. |

This oil possesses the characteristic odor of derris root and is responsible for the insect repelling property of derris products while the insecticide remains undistilled.

Valuable insect repellent preparations may be prepared with this oil. For example, an efficient fly and mosquito repellent can be made by mixing ¼ of 1% oil of derris with 99¾% of white petrolatum.

The wet residue left in the still after the removal of the traces of solvent and all, or part, of the essential oil is removed and broken up into small lumps. It is placed on trays and dried. The dried product is then run through a mill and ground to the desired fineness.

Example 2

The organic solvent solution of these insecticidal principles, hydrogenated or not, is placed in a vacuum still and the bulk of the solvent is removed at atmospheric pressures. The final traces of solvent and some of the essential oil is removed under reduced pressure. The residue, due to the absence of water is at this point mauid, and may be run out in this state through a draw-off on the bottom of the still. It solidifies upon cooling and may be pulverized.

Example 3

The above method is applicable when removing non-chlorinated solvents. The chlorinated solvents such as carbon tetrachloride, ethylene dichloride, et cetera decompose slightly even under diminished pressure forming free hydrochloric acid, the presence of which causes the destruction of part of the active principles and yields a dark colored product. The rotenone yield is lowered to a large extent as a result of this destructive action.

I have overcome this trouble by adding a small amount of an anhydrous alkaline earth carbonate or alkali metal carbonate to the contents of the still prior to the distillation. The free acid is thus neutralized as fast as it is formed.

Anhydrous sodium carbonate and potassium carbonate are examples of the alkaline carbonates and calcium carbonate, and magnesium carbonate are representative of the type of alkaline earth carbonates that may be used.

Derris and cube roots contain certain plant acids and other alkali soluble material, some, or all, of which are present in extracts obtained by extracting the roots with volatile solvents. These materials cause premature darkening of extracts containing them. Derris and cube roots yield extracts of varying degrees of color. Extracts obtained by extracting roots which contain little coloring matter quickly darken with age or upon exposure to light and air. This is not entirely due to the decomposition of the active principles such as rotenone which forms yellow decomposition products. It is mainly due to the plant acids and alkali soluble material which darkens more quickly and to a deeper shade of color upon exposure to light and air than does rotenone. This darkening action sometimes takes place in the root itself as a result of prolonged storage or because of exposure to air.

I have found that these plant acids and other alkali soluble materials may be removed from water immiscible extracts containing same, regardless of whether or not they have become darkened as a result of exposure to air or light before or after extracting them from the original roots, by subjecting such extracts to the action of a weak aqueous solution of an alkali such as caustic soda, caustic potash, et cetera.

The alkali dissolves the plant acids and other alkali soluble material. The solution of combined alkali soluble materials have the disadvantage of forming an emulsion with the water immiscible solvent extract of insecticidal principles rendering the separation of the latter from the aqueous layer somewhat difficult.

I have overcome this drawback by adding a water soluble alkali metal carbonate, such as sodium carbonate to the caustic alkali solution. The mixture separates quickly into two layers. The aqueous solution is withdrawn and is replaced with an equal amount of water. This mixture is allowed to settle, the water drawn off, and the cloudy solution of insecticide principles is dried with a water absorbent such as anhydrous sodium carbonate, calcium sulphate, et cetera and filtered. The resulting product is clear and light amber colored retaining the same shade indefinitely if stored in air tight and light resisting containers.

If a dry powdered extract is desired the treatment with the driers is omitted as the distillation of the solvent will remove the traces of water simultaneously.

The preparation of the dried product is carried out as outlined above. The resulting dried extract is light colored, varying from a light amber to a light yellow. This product will find application in preparing products which necessarily must be free from color. Commercially it will be more saleable than a product not so treated.

It is understood that these light colored derris or cube extracts may also be manufactured from extracts which have been hydrogenated either before or after the alkali treatment.

These light colored products may be used in lieu of rotenone as its much lower cost will allow its use in preparations which now contain only rotenone. The light colored material obtained from hydrogenated extracts is of special value in moth proofing solutions. Dihydrorotenone or hydrogenated derris or cube extracts are of greater value for this purpose than rotenone because of their air and light resisting properties.

By "insecticidal products from derris and similar insecticidal vegetable sources" as used in my claims, I mean both the insecticidal products as actually found in derris and other insecticidal vegetable sources and the hydrogenated compounds thereof, among which are rotenone and dihydrorotenone.

I do not limit myself to the particular vegetable sources, times, temperatures or steps of procedure specifically mentioned as these are given simply as a means for clearly explaining my invention.

What I claim is:—

1. In a process for the production of a dry, friable insecticidal product from derris and similar insecticidal-containing vegetable sources, the steps which comprise extracting the insecticidal principles from the vegetable source by means of a volatile chlorinated solvent, adding a member of the group consisting of anhydrous alkali metal carbonates and anhydrous alkali earth metal carbonates to the solvent and removing practically all of the solvent and distillable oils therefrom by distillation.

2. In a process for the production of a dry, friable insecticidal product from derris and similar insecticidal-containing vegetable sources, the steps which comprise extracting the insecticidal principles from the vegetable source by means of a water-immiscible solvent, adding an aqueous solution of an alkali metal hydroxid thereto, separating the aqueous solution from the water-immiscible solution, and removing practically all of the solvent and distillable oils from the water-immiscible extract by distillation.

3. In a process for the production of a dry, friable insecticidal product from derris and similar insecticidal-containing vegetable sources, the steps which comprise extracting the insecticidal principles from the vegetable source by means of a water-immiscible solvent, adding an aqueous solution of an alkali metal hydroxid and an aqueous solution of an alkaline earth carbonate thereto, separating the aqueous solution from the water-immiscible solution, and removing practically all of the solvent and distillable oils from the water-immiscible extract by distillation.

4. In a process for the production of a dry, friable insecticidal product from derris and similar insecticidal-containing vegetable sources, the steps which comprise extracting the insecticidal principles from the vegetable source by means of a volatile solvent, subjecting the solution to distillation and recovering a distillate oil having a specific gravity at 25° C. of .998, an optical rotation 100 m. m. tube of +5°, a saponification value of 24, a saponification value after acetylization of 82.6 and a boiling range 760 m. m. of 210°–250° C.

5. In a process for the production of a dry, friable insecticidal product from derris and similar insecticidal-containing vegetable sources, the steps which comprise extracting the insecticidal principles from the vegetable source by means of a water-immiscible solvent, adding an aqueous solution of an alkali metal hydroxid thereto, removing the aqueous alkali solution of alkali soluble materials and by distillation recovering a distillate oil having a specific gravity at 25° C. of .998, an optical rotation 100 m. m. tube of +5°, a saponification value of 24, a saponification value after acetylization of 82.6 and a boiling range 760 m. m. of 210°–250° C.

6. In a process for the production of a dry, friable insecticidal product from derris and similar insecticidal-containing vegetable sources, the steps which comprise extracting the insecticidal principles from the vegetable source by means of a chlorinated water-immiscible solvent, adding an anhydrous alkali metal carbonate thereto and by distillation recovering a distillate oil having a specific gravity at 25° C. of .998, an optical rotation 100 m. m. tube of +5°, a saponification value of 24, a saponification value after acetylization of 82.6 and a boiling range 760 m. m. of 210°–250° C.

7. In a process for the production of a dry, friable insecticidal product from derris and similar insecticidal-containing vegetable sources, the steps which comprise extracting the insecticidal principles from the vegetable source by means of a water-immiscible solvent, adding an aqueous solution of an alkali metal hydroxid and an aqueous solution of an alkaline earth carbonate thereto, removing the aqueous alkali solution of alkali soluble materials and by distillation recovering a distillate oil having a specific gravity at 25° C. of .998, an optical rotation 100 m. m. tube of +5°, a saponification value of 24, a saponification value after acetylization of 82.6 and a boiling range 760 m. m. of 210°–250° C.

8. As a new compound, the oil obtainable from an extract of derris and similar vegetable sources, the oil having the specific gravity at 25° C. of .998, an optical rotation 100 m. m. of +5°, a saponification value of 24, a saponification value after acetylization of 82.6 and a boiling range 760 m. m. of 210°–250° C.

9. As a new product having insect repelling properties, a mixture of petroleum hydrocarbons and the oil obtainable from an extract of derris and similar vegetable sources, the oil having the specific gravity at 25° C. of .998, an optical rotation of 100 m. m. of +5°, a saponification value of 24, a saponification value after acetylization of 82.6 and a boiling range 760 m. m. of 210°–250° C.

10. As a new product having insect repelling properties, a mixture of petrolatum and the oil obtainable from an extract of derris and similar vegetable sources, the oil having the specific gravity at 25° C. of .998, an optical rotation 100 m. m. of +5°, a saponification value of 24, a saponification value after acetylization of 82.6 and a boiling range 760 m. m. of 210°–250° C.

11. In a process for the production of a dry, friable insecticidal product from derris and similar insecticidal-containing vegetable sources, the steps which comprise extracting the insecticidal principles from the vegetable source by means of a volatile chlorinated solvent, subjecting said principles to a hydrogenating process, adding a member of the group consisting of anhydrous alkali metal carbonates and anhydrous alkali earth metal carbonates to the solvent and removing practically all of the solvent and distillable oils therefrom by distillation.

12. In a process for the production of a dry, friable insecticidal product from derris and similar insecticidal-containing vegetable sources, the steps which comprise extracting the insecticidal principles from the vegetable source by means of a water-immiscible solvent, subjecting said principles to a hydrogenating process, adding an aqueous solution of an alkali metal hydroxid thereto, separating the aqueous solution from the water-immiscible solution, and removing practically all of the solvent and distillable oils from the water-immiscible extract by distillation.

13. In a process for the production of a dry, friable insecticidal product from derris and similar insecticidal-containing vegetable sources, the steps which comprise extracting the insecticidal principles from the vegetable source by means of a water-immiscible solvent, subjecting said principles to a hydrogenating process, adding an aqueous solution of an alkali metal hydroxid and an aqueous solution of an alkaline earth carbonate thereto, separating the aqueous solution from the water-immiscible solution, and removing practically all of the solvent and distillable oils from the water-immiscible extract by distillation.

14. In a process for the production of a dry, friable insecticidal product from derris and similar insecticidal-containing vegetable sources, the steps which comprise extracting the insecticidal principles from the vegetable source by means of a volatile solvent, subjecting said principles to a hydrogenating process, subjecting the solution to distillation and recovering a distillate oil having a specific gravity at 25° C. of .998, an optical rotation 100 m. m. tube of +5°, a saponification value of 24, a saponification value after acetylization of 82.6 and a boiling range of 760 m. m. of 210°–250° C.

15. In a process for the production of a dry, friable insecticidal product from derris and similar insecticidal-containing vegetable sources, the steps which comprise extracting the insecticidal principles from the vegetable source by means of a water-immiscible solvent, subjecting said principles to a hydrogenating process, adding an aqueous solution of an alkali metal hydroxid thereto, removing the aqueous alkali solution of alkali soluble materials and by distillation recovering a distillate oil having a specific gravity at 25° C. of .998, an optical rotation 100 m. m. tube of +5°, a saponification value of 24, a saponification value after acetylization of 82.6 and a boiling range 760 m. m. of 210°–250° C.

16. In a process for the production of a dry, friable insecticidal product from derris and similar insecticidal-containing vegetable sources, the steps which comprise extracting the insecticidal principles from the vegetable source by means of a water-immiscible solvent, subjecting said principles to a hydrogenating process, adding an anhydrous alkali metal carbonate thereto and by distillation recovering a distillate oil having a specific gravity at 25° C. of .998, an optical rotation 100 m. m. tube of +5°, a saponification value of 24, a saponification value after acetylization of 82.6 and a boiling range 760 m. m. of 210°–250° C.

17. In a process for the production of a dry, friable insecticidal product from derris and similar insecticidal-containing vegetable sources, the steps which comprise extracting the insecticidal principles from the vegetable source by means of a water-immiscible solvent, subjecting said principles to a hydrogenating process, adding an aqueous solution of an alkali metal hydroxid and an aqueous solution of an alkaline earth carbonate thereto, removing the aqueous alkali solution of alkali soluble materials and by distillation recovering a distillate oil having a specific gravity of 25° C. of .998, an optical rotation 100 m. m. tube of +5°, a saponification value of 24, a saponification value after acetylization of 82.6 and a boiling range 760 m. m. of 210°–250° C.

ROBERT WOTHERSPOON.